UNITED STATES PATENT OFFICE.

ABIEL W. NELSON, OF NEW LONDON, CONNECTICUT.

DISINFECTANT.

SPECIFICATION forming part of Letters Patent No. 696,105, dated March 25, 1902.

Application filed May 6, 1901. Serial No. 58,937. (No specimens.)

*To all whom it may concern:*

Be it known that I, ABIEL W. NELSON, a citizen of the United States, residing at New London, in the county of New London and State of Connecticut, have invented a new and useful Composition of Matter to be Used as a Disinfectant, Deodorizer, and Fertilizer, of which the following is a specification.

My composition consists of the following ingredients combined in substantially the manner and proportions stated, to wit: sawdust, shavings, or other waste-wood products, sulfate of aluminium, sulfate of calcium. In combining the above-named ingredients the wood-waste is first saturated with a solution of sulfate of aluminium. I preferably use an acid solution for dissolving the sulfate of aluminium; but water could be used with very satisfactory effect. To the saturated wood-waste I add an insoluble compound of calcium, which drys and sets and coats the wood-waste and makes the product easy of application as a disinfectant. It increases the strength of the product without less adhesion to add also to these earths the soluble salts of aluminium or other disinfecting salts of substantially the same effect. In thus coating the wood-waste I prefer to use a mixture consisting of sulfate of aluminium, one part, and sulfate of calcium, two parts.

The wood-waste and insoluble compounds of calcium and aluminium are more convenient as a vehicle for the soluble and disinfecting aluminium salts than water in the matter of cost, storage, transportation, and application, and the product is equally efficient pound for pound. The action and effect also are more prolonged, as required in the uses herein named. It will thus be seen that I have produced a disinfectant consisting of waste-wood products saturated with sulfate of aluminium and coated with sulfate of calcium. The disinfectant is in granular form, whereby it is easy of application, and is also porous, non-corrosive, harmless, and cheap. The coating of sulfate of calcium also prevents deterioration, so that the life of the compound is prolonged. The resulting product is a powerful disinfectant.

The purpose of my newly-invented composition of matter is to provide a safe and reasonably cheap product for the disinfecting and deodorizing of animal excrements, garbage, and noxious substances in stables, pig-pens, kennels, outhouses, zoological collections, &c., and to prevent the breeding therein of flies and mosquitoes, thereby greatly lessening the sources of infectious diseases, the said composition being itself not injurious to domestic animals and mankind. It may also be used as an antiseptic bedding for animals. It prevents noxious emanations from injuring the eyes and the physical condition of animals, protects from injury by free ammonia the varnish and paint of the inside walls of stables and of vehicles stored therein, and fixes the ammonia in excrements and garbage, thereby preserving their fertilizing qualities, and is itself a valuable fertilizer.

What I claim, and desire to secure by Letters Patent of the United States, is—

The herein-described composition of matter, consisting of waste-wood products saturated with sulfate of aluminium and coated with sulfate of calcium, substantially as described.

ABIEL W. NELSON.

Witnesses:
FRANK H. ALLEN,
JOHN E. CLARK.